United States Statutory Invention Registration [19]

McDonald et al.

[11] Reg. Number: H716

[43] Published: Dec. 5, 1989

[54] PARALLAX INDUCED POINTING ERROR AVOIDANCE METHOD AND MEANS FOR SYSTEMS USING TOUCH SCREEN OVERLAYS

[76] Inventors: James E. McDonald, 5184 Tellbrook Ct., Las Cruces, N. Mex. 88001; Jimmy D. Stone, 2807 Humboldt Cir., Longmont, Colo. 80501

[21] Appl. No.: 121,024

[22] Filed: Nov. 16, 1987

[51] Int. Cl.[4] ..... G09G 3/02

[52] U.S. Cl. ..... 340/712; 178/18; 178/19

[58] Field of Search ..... 340/706–712; 178/18, 19

[56] References Cited

U.S. PATENT DOCUMENTS

| | | | |
|---|---|---|---|
| 4,198,623 | 4/1980 | Misek et al. | 340/712 |
| 4,355,202 | 10/1982 | DeCosta et al. | 178/18 |
| 4,361,725 | 11/1982 | Dagnelie et al. | 178/19 |
| 4,567,480 | 1/1986 | Blanchard | 340/712 |
| 4,587,520 | 5/1986 | Astle | 340/710 |
| 4,710,758 | 12/1987 | Mussler et al. | 340/712 |
| 4,764,885 | 8/1988 | Greanias et al. | 178/19 |

OTHER PUBLICATIONS

Datamation, vol. 30, No. 1, pp. 146, 148, 152, 154, entitled "Touch Screens: Big Deal or No Deal?" by M. Tyler dated Jan. 1984.

IBM Technical Disclosure Bulletin, vol. 22, No. 8B, Jan. 1980, pp. 3542–3543, entitled "Computer Interface Device" by P. J. Kennedy.

*Primary Examiner*—Thomas H. Tarcza
*Assistant Examiner*—Linda J. Wallace

[57] ABSTRACT

In a system using a touch panel type of overlay on a cathode ray tube screen wherein multiple areas for user selection are presented on the tube screen, erroneous touch selection of displayed areas on the tube because of parallax-induced offset is avoided by assigning a guard band around each display area. The width of the band is designed to correlate to the amount of parallax error associated with the combined tube and overlay touch screen environment.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PARALLAX INDUCED POINTING ERROR AVOIDANCE METHOD AND MEANS FOR SYSTEMS USING TOUCH SCREEN OVERLAYS

TECHNICAL FIELD

The present invention relates to touch sensitive selection screens or panels which overlay displays that concurrently present a multiplicity of visual areas for user selection. More particularly, the present invention relates to systems using touch screen panels overlaying visual display devices, wherein parallax effects can cause the user to erroneously select an area presented on the visual display. The invention is especially useful for systems using a cathode ray tube (CRT) as a display with a transparent touch screen overlaying the CRT face so that the user can select from amongst areas on the display, as by touching, light pen operation, or the like.

BACKGROUND

The use of display screens as an interface between users and electronic systems of various types is attractive to the data processing industry because of its flexibility and speed. Selection of an item from the display by the user can cause a wide variety of responses by the system. It can initiate internal activities within the system, such as is involved in calling up or processing databases, or it can produce external actions, such as handling of process control functions. Further, the system can reconfigure the display presented to offer a subset of selections in response to the first selection, it can simulate cause and effect relationships, such as by simulating arrays of buttons, lights, knobs, etc., that a user might expect to encounter in a physical implementation of the display, and thereafter visualizing simulated effects of operating those elements.

In many cases, the display-to-user interface is obtained by displaying multiple items for selection on the face of a CRT, or the like, with the user employing a keyboard as the means for selecting the desired item. Typically, the selection is accomplished by entering a letter or symbol from the keyboard, or by manipulating a cursor to align with the desired selection. Other means, such as the so-called mouse and tablet devices, are also sometimes used in conjunction with cursor-oriented selection. Regardless, parallax offsetting of the displayed items or areas, as seen by the user, are irrelevant under those circumstances.

Arrangements of touch-sensitive screens or panels as an overlay to the display surface have evolved and enjoy the benefit of freeing the user from the keyboard. The elements and operation of a contemporary touch screen system are succinctly described in the article entitled COMPUTER INTERFACE DEVICE by P. J. Kennedy in the January 1980 IBM TECHNICAL DISCLOSURE BULLETIN (Vol. 22, No. 8B) at pages 3542–3543. The ease with which a user can learn to utilize such configurations is evidenced by the fact that touch screen systems have found use as training aids for small children who cannot read, much less use a keyboard. The user need only point a finger, light pen, rod, or the like, directly on the item or area seen on the screen; the controls associated with the touch screen interpret the item or area selected in a manner transparent to the user.

Unfortunately, the thickness of the face of the CRT and the touch screen intervene between the display plane and the viewer. Thus, if the user is looking along a line that is not substantially perpendicular to the plane of the target item or area for which selection is intended while little or no space separates that target from its neighbors, the user's finger or pen may well actually overlie the neighbor. The electronics will then cause erroneous selection of the neighbor.

The existence of the hazard of parallax induced pointing errors in touch screen selection is known in the prior art. For instance, U.S. Pat. No. 4,567,480 by Blanchard, as well as the January 1984 DATAMATION magazine article at pages 146–154, both recognize the problem, but neither suggests a solution other than to admonish the user to sit directly in front of the screen and at eye level.

Others have recognized the problem and tried resolution by modifying the structure associated with the touch screen. For example, U.S. Pat. No. 4,198,623 by Misek et al configures a special array of light sources and sensors in an effort to minimize the parallax effects of the edge curvature in CRT's. U.S. Pat. No. 4,355,202 by DeCosta et al teaches a frame of force translating cones and piezoelectric sensors surrounding a display in an effort to place the display and selection planes as near coincidence as possible while admitting that a finite thickness between those two planes will involve parallax distortion.

Since CRT faces have a finite thickness with the display plane occurring on the interior surface thereof, it is impossible to obtain complete coincidence between the touch screen plane and the display plane. Yet another approach is taken in U.S. Pat. No. 4,361,725 by Dagnelie et al which suggests that it is possible to arrange X-Y grid wires across the tube face in a configuration that will correct for parallax errors.

None of the known prior art has taught or suggested elimination or minimization of parallax induced touch screen selection errors in a manner that can accommodate existing touch screen panels without modifying the display, the touch screen panel, the display-to-panel mounting environment, or some combination thereof. However, that result is advantageously realized by the present invention.

DISCLOSURE OF THE INVENTION

The present invention overcomes selection errors caused by parallax distortion which causes the user to believe one area of a display is selected when the user's finger or selecting device is actually selecting another area of the display. While the invention is described with emphasis on parallax errors in conjunction with CRT's, those having normal skill in the art will understand that the invention is useful for any combination of display and touch-screen type of combination which involves potential parallax offset of the perceived display area. Briefly, the present invention contemplates resolving the parallax-induced error problem by assigning a guard band around each display area available for touch selection where the width of that band is correlated to the amount of parallax error associated with the desired CRT and touch screen environment.

More particularly, the present invention uses a process of compensating for parallax errors associated with use of an electronically-generated visual display which is viewed through a medium prone to causing apparent image displacement from parallax distortion. The touching of one or more discrete areas by the user is intended to cause actuation of some form of system response. In accordance with the invention, the amount of visually-apparent image shifting caused by parallax effects from the medium is initially determined. A guard band invisible to the user is assigned to each area of the electronically generated visual display which is potentially available for touch actuation. This guard band has a width which incorporates an area correlated to the enlarged apparent area of the surrounded area caused by the parallax distortion. Further, the system responds to touching within the guard band by generating a signal indicative that the surrounded area was actually selected.

Still further, the size of the guard band is a function of the maximum angle of viewing relative to the display screen that the system is to accommodate. By deciding upon that angle, as well as determining the combined parallax offset at that angle associated with the thickness of the CRT face and the touch panel, the width of the guard band is determinable and assignable to each potentially-selectable area of the display.

Those having normal skill in the art will recognize the foregoing and other objects, features, advantages and applications of the present invention from the following more detailed description of the preferred embodiment as illustrated in the accompanying drawings.

DETAILED DESCRIPTION OF THE PREFERRED EMBODIMENT

Figure 1:
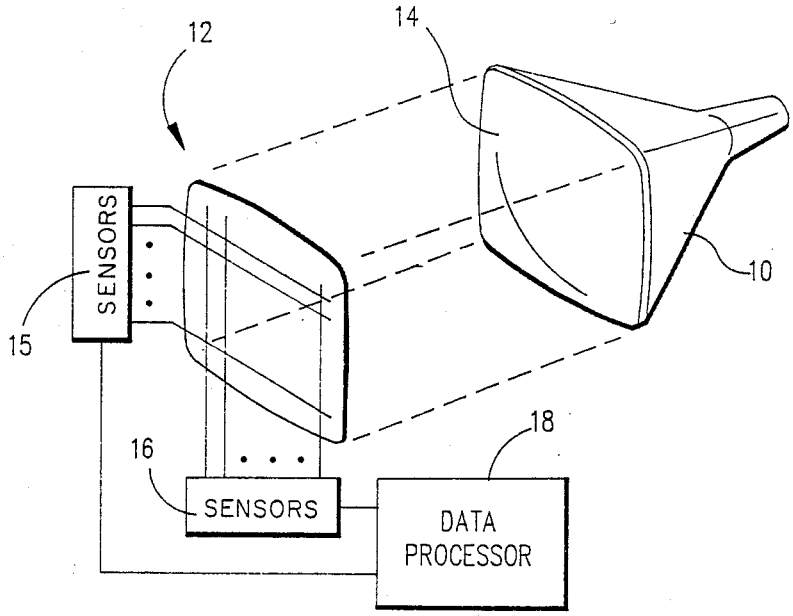
FIG. 1 is a partially schematic view of the environment of a touch screen actuated system in which the present invention is useful.

A typical environment of a system using a cathode ray tube or CRT 10 having a transparent touch screen overlay 12 is shown in FIG. 1. Screen 12, in normal use, is placed directly over the face 14 of CRT 10 as is well known; it is shown displaced in FIG. 1 merely for convenience of this description. Touch screen assembly 12 includes an X-Y matrix which responds to touching by generating output signals into sensors 15 and 16. The two output signal sets are coupled to data processor 18. Touch detection is by any of several well known systems, such as capacitive or inductive sensors, light path interruption, contact switches, and the like. The foregoing, along with the electronics in processor 18 for correlating the touching of screen 12 with a particular display, or part of a display, is likewise well known and therefore is not further described here.

The user-to-machine interface provided by the screen and CRT combination allow the users to electronically interact with the associated data processing system. For instance, the user can simulate physical selection of objects, such as buttons, keys, icons, and switches, with the data processing responding with an appropriate simulated result. There are several advantages to this technology in terms of flexibility, directness and cost. A user-system interface employing touch screen/CRT technology is easily created and modified. The technology makes multiple panels or "menus" available under software control. In short, the technology permits a highly flexible software generated user-to-system interface.

CRT/touch screen combinations also offer advantages over indirect pointing mechanisms including keyboards, "mouse" or "joy-stick" devices, or the like. With such contemporary indirect pointing, the user must manipulate a control device which typically causes a visible cursor to move on the CRT display. When the cursor is positioned on the desired object, the user must select it, usually by pushing an independent button on the control device.

With a touch screen and CRT combination the user simply points a finger, light pen or any other suitable pointing object at the desired object in a natural fashion. However, if the user is not looking in a direction perpendicular to the surface defined by the touch screen and CRT, parallax-induced errors will occur. These errors result from the fact that there is a separation between the surface on which the object actually appears (the inner front surface of the CRT face 14) and the touch sensitive area impacted by the user intending to select that area.

The separation varies with the touch screen technology, but is always present to some degree. The parallax problem does not occur with real objects nor does it occur with indirect pointing devices and CRT-generated objects. Parallax-induced pointing errors are eliminated in accordance with the present invention by making the touch area for an object larger than its visually-displayed area. The exact size of the area is determined by considering (1) the separation between the phosphor coated surface inside CRT 10 behind face 14 and the surface touched by the user, (2) the maximum anticipated (or allowable) viewing angle offset from the perpendicular relative to the object in both the vertical and horizontal directions, and (3) the index of refraction of the materials used in the CRT 10 and the touch screen 12. This equation is also used to determine the minimum acceptable separation between objects, such as buttons presented on the touch screen 12 and CRT 10 interface.

If the user views the CRT 10/screen 12 interface at an angle and attempts to touch an object or area displayed on face 14, the user may unintentionally indicate apparent selection of the wrong area because of visual parallax, the refraction of light and the glass thickness at face 14 of CRT 10, as well as the touch sensitive panel 12 thickness.

By determining the maximum predicted viewing angle for the user relative to the interface between CRT 10 and screen 12, the refraction indexes of the CRT 10 glass and the touch screen 12, the degree to which the touch-sensitive area should exceed the corresponding display object is determined. The following is a detail description of that process along with an example.

The following is an example of the application of this invention. For this example, assume that:

- $Rg=1.5$; the index of refraction of glass of CRT 10 and touch panel 12
- $Tg=12.7$ mm; the thickness of the glass of CRT 10 at face 14
- $Tt=2.64$ mm; the thickness of touch panel 12
- $A1=45$ degrees; maximum predicted viewing angle from normal to CRT face 14
- $A2=SIN^{-1}[(SIN\ A1)/Rg]=28.125$ degrees Since the amount of parallax-induced pointing error is determined by the separation between the actual location of a point on the phosphor surface at the rear of face 14 of CRT 10 and the point at which the user will intersect the outer surface of the touch screen 12 while attempting to touch the location where the phosphor point appears, the amount of the "touch discrepancy" is described by:

$$P=(Tg+Tt)\tan A2$$

where P=distance of parallax induced pointing error.

In the present example, $$\begin{aligned} P &= 15.34 \tan 28.125 \\ &= 8.2 \text{ mm} \end{aligned}$$

The amount of touch error is expected to occur from both sides of the CRT 10. Accordingly, the sense area around any object should extend by a 8.2 mm guard band beyond the displayed object. Thus the minimum separation between neighboring touch-selectable displayed objects is 16.4 mm. Note that this figure applies to the particular example presented, and for other applications it is necessary to calculate the useful guard band based on the data associated with the components involved in that system.

Figure 2:
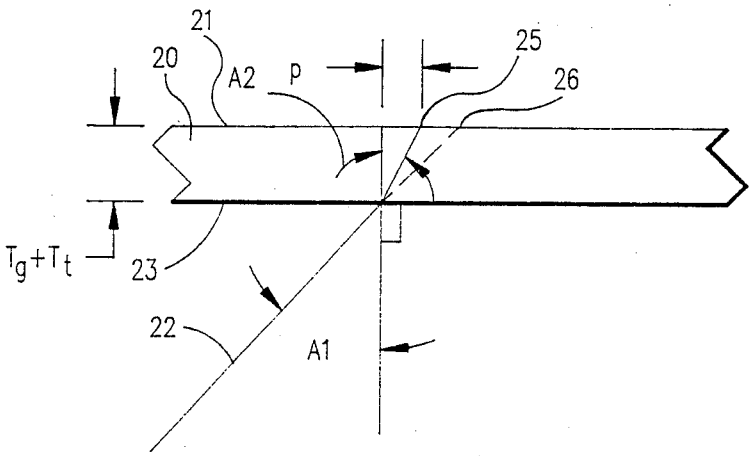
FIG. 2 illustrates the optics associated with viewing displacement induced by parallax phenomenon.

The relationship discussed above is shown in FIG. 2 which presents a broken section of the display face for CRT 10. Plate 20 symbolically represents the combination of both the face plate of CRT 10 and the thickness of touch panel 12 overlying face 4 of CRT 10 (i.e., Tg+Tt, as shown). The user is assumed to observe along line 22 at an angle A1 relative to the normal of the outer face 23 of panel 12. The actual point of information display occurs at point source 25 on the phosphor coated rear face 21 at an angle A2, and displacement P from the normal to surfaces 21 and 23. However, because of the parallax involved, the apparent point source appears at point source 26. If a second touch-sensitive display area existed at point 26, selection of that area results in erroneous input to the system.

Figure 3:
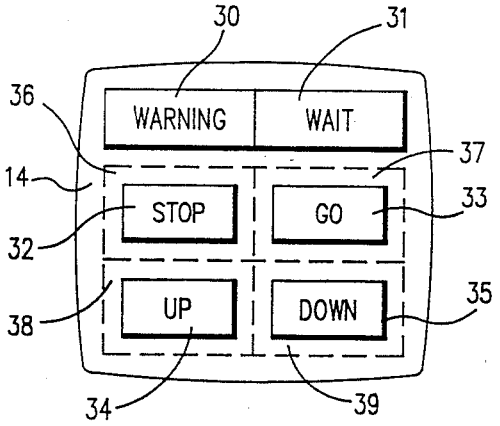
FIG. 3 is a sample of a display with guard bands assigned to selectable areas thereof in accordance with the present invention.

A somewhat simplified display is shown in FIG. 3. CRT display face 14 has areas 30 and 31 which are instructional to the user; these areas are not user selectable. They do not hazard parallax induced errors and are presented with their boundaries abutting without separation. Areas 32, 33, 34, and 35 are assumed as intended for touch selection by the user. Therefore, areas 32 to 35 are surrounded by invisible guard bands 36 to 39, respectively. Bands 36–39 each have a width of P which, in the example mentioned previously, is 8.2 mm. That is, areas 32 and 33 are separated from areas 30 and 31 by 8.2 mm, while areas 32 to 35 are separated from each other by 16.4 mm.

Any user who actually touches bands 36, 37, 38, or 39 because of parallax offset while believing the associated action area is touch selected, will correctly actuate the intended target, namely STOP area 32, GO area 33, UP area 34, or DOWN area 35, respectively.

Note that the guard bands need not always completely surround the touch-selectable display areas. If the risk of parallax-induced errors is considered to exist only in horizontal planes, it is possible to omit the bands above and below the selectable areas, or vice versa. Furthermore, the bands can have different widths around the surrounded areas. For instance, the system can accommodate a shallow angle for Al in the vertical direction in contrast to a larger angle Al in the horizontal direction relative to the surrounded selectable display area. Regardless, once determined in accordance with this invention, addition of the guard bands to the edges of the display areas is accomplished by well known programming techniques. These techniques are well within the skill of those having normal skill in the art and therefore are not further described herein.

Although the foregoing describes the exemplary preferred embodiment in relatively specific detail, those having normal skill in the art will recognize various changes, modifications, additions and applications other than those specifically mentioned herein without departing from the spirit of this invention.

What is claimed is:

1. The process of compensating for parallax-induced errors associated with use of an electronically generated visual display which is viewed through a medium that is prone to causing apparent image displacement from parallax distortion and wherein touching by the user of one or more discrete areas causes actuation of a touch responsive means, comprising the steps of:

determining the amount of offset distance of visually apparent shift caused by parallax from viewing said medium at a preselected maximum angle relative to the display surface;

assigning a guard band around at least a portion of the perimeter of each area of the electronically-generated visual display which is to receive selected touch actuation with said guard band having a width for extending the perimeter of said touch selected area by an amount correlated to said determined offset distance caused by said parallax distortion; and responding to touching within said guard band by generating a signal for indicating to the touch responsive means that the said discrete area adjacent to said guard band was touched.

2. The process in accordance with claim 1 for use with a display composed of a cathode ray tube having a transparent touch sensitive screen overlay, said determining step including the step of determining the parallax shift at the said preselected maximum angle relative to the display surface through the combined media of said tube and said screen.

3. The process of avoiding parallax-induced errors in an electronically-generated display visible at a surface through a plate of a thickness T of transparent media having a refraction index R where the display is to function as an input device to a data processing system, or the like, by touching of areas associated with the display comprising the steps of:

determining the maximum angle A1 from perpendicular from the said display surface for which touch selection is allowed free from parallax-induced errors; and providing a guard band along at least a portion of the perimeter of each touch-selective area of the display where the width P of the guard band is the product of T times tan A2 where A2 is equal to $SIN^{-1}[(SIN\ A1)/R]$.

4. The process in accordance with claim 3 wherein said guard band is invisible and the spacing between the edges of any neighboring touch-selective display areas is 2P.

5. The process of avoiding parallax-induced errors in an electronically-generated display visible at the inner surface of a cathode ray tube having a face plate of a thickness Tg of transparent media having a refraction index Rg with a touch-sensitive panel overlaying said display face where the panel has a thickness Tp and a refraction index Rg, and where the display is to function as an input device to a data processing system, or the like, by detecting the touching of said panel in areas associated with the display at the cathode ray tube inner surface comprising the steps of:

determining the maximum angle Al for the viewer's line of sight from a line perpendicular to the plane of the display inner surface for which touch selection is allowed free from parallax-induced errors; and providing a guard band around each area of the cathode ray tube display which is touch selectable at the touch panel where the width P of said guard band is defined by $$P=(Tg+Tp)\tan A2$$

wherein $$A2=SIN^{-1}/[(SIN\ A1)/Rg].$$

6. The process in accordance with claim 5 wherein said providing step establishes an invisible said guard band with at least 2P separation between visible boundaries of touch-selectable areas on the tube display.

* * * * *